Sept. 8, 1942.                W. H. CHURCHILL                2,295,449
               FASTENER MEMBER AND FASTENER INSTALLATION
                          Filed June 13, 1939
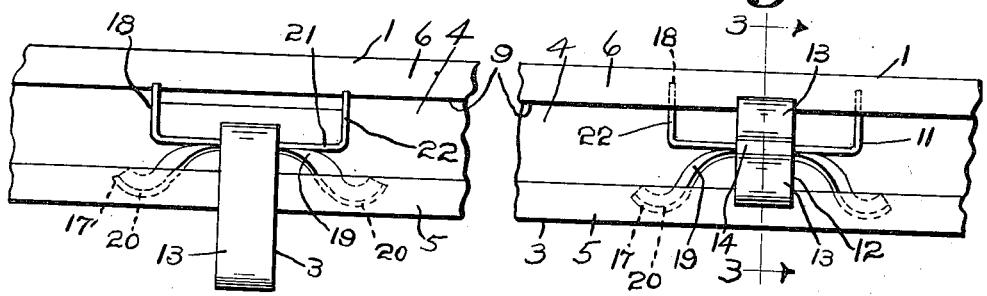
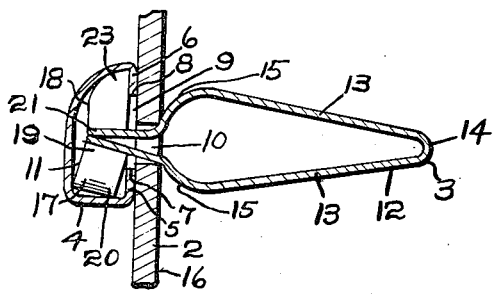
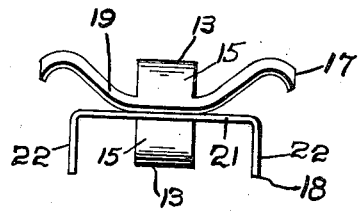
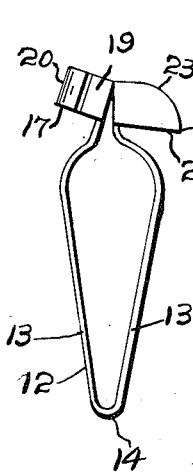
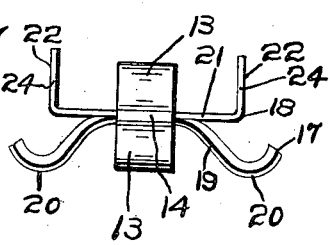
Inventor:
Wilmer H. Churchill.
by John Todd
Att'y.

Patented Sept. 8, 1942

2,295,449

UNITED STATES PATENT OFFICE 2,295,449

FASTENER MEMBER AND FASTENER INSTALLATION

Wilmer H. Churchill, Saugus, Mass., assignor to United-Carr Fastener Corporation, Cambridge, Mass., a corporation of Massachusetts Application June 13, 1939, Serial No. 278,863

4 Claims. (Cl. 189—88)

This invention relates to snap fastener members of the type designed for fastening two apertured bodies together and installations of the same.

The chief object of this invention is the provision of a fastener member adapted to be assembled with a molding strip or the like having an elongated aperture at one side through hooking one attaching portion of the fastener member into the molding through the opening and then by a rocking action snapping another attaching portion by an edge of the molding adjacent the opening to assemble firmly the fastener member with the part.

Other objects and uses of my invention will be apparent from inspection of the drawing and specification hereinbelow set forth.

Referring to the drawing, in which I have illustrated a preferred embodiment of my invention:

Fig. 1 is a bottom plan view of the molding installation showing the manner in which my improved fastener member is rocked into assembly with the molding;

Fig. 2 is a view similar to Fig. 1 showing the fastener member in final assembled position with the molding;

Fig. 3 is a sectional view taken along the line 3—3 of Fig. 2 and showing the molding secured to a supporting panel;

Fig. 4 is a top plan view of my improved fastener member per se;

Fig. 5 is an end view of the fastener member per se;

Fig. 6 is a front view of the fastener member per se; and

Fig. 7 is a bottom view of the fastener member pe se.

My invention, as illustrated in the accompanying drawing, relates specifically, though not exclusively, to a fastener secured installation wherein a fastener member of simple construction is quickly and easily attached to a hollow part such as a molding. After assembly of the fastener with the molding, the fastener member is snapped into engagement with a supporting panel so as to secure the molding to the same.

The particular installation which I have chosen for the purpose of illustrating my invention includes a hollow sheet metal molding strip 1 secured to a supporting panel 2 (Fig. 3) by means of my improved fastener member 3. The molding strip 1 is of the type commonly used for ornamenting the exterior surfaces of an automobile body and provides an outer side 4 having a hollow cross-sectional shape and an inner side comprising inwardly-extending flanges 5 and 6. The innermost edges 7 and 8 respectively of the flanges 5 and 6 are spaced apart for substantially their entire length defining an elongated opening 9. The supporting structure 2, which is preferably of thin metal material, has an aperture 10 therein to receive a stud means of the fastener member 3.

Referring to my preferred form of fastener member, I have shown a fastener member of simple construction which is formed from one piece of spring metal. The fastener member 3, in my preferred construction, comprises a base portion 11 adapted to be seated firmly within the hollow body of the molding strip 1 and a stud means 12 extending beneath the base 11 for passage through the aperture 10 of the support 2 to secure the molding to the panel. The stud means 12 may be of any suitable construction, but in my preferred form I have shown one having a pair of oppositely-disposed yieldable legs 13—13 connected at their leading ends to form a nose 14. The legs 13—13 are bowed outwardly intermediate their ends forming shoulders 15 for engagement behind the inner surface 16 of the support 2. The base 11, the construction of which is the chief feature of my present invention, comprises a pair of attaching portions or arms 17 and 18 integrally joined at substantially their mid-portions to respective ends of the legs 13—13 opposed to their connected ends. The planes of the broad surfaces of the arms 17 and 18 are disposed substantially parallel to the axis of the stud means 12 with inner broad surfaces of the arms substantially facing each other and normally in contiguous relation, in my preferred form, as most clearly shown in Figs. 4 and 5. It will be noticed that I have chosen to describe the planes of the broad surfaces of the arms 17 and 18 as being substantially parallel to the axis of the stud means 12 because in my preferred form I have preferred to tip the arm 17 slightly relative to the arm 18, as most clearly shown in Fig. 5. The arm 17 has a yieldable portion 19 bent outwardly away from the arm 18 to provide a bow and providing portions 20—20 adjacent its opposite ends adapted to engage the inner surface of the walls of the molding 1 during assembly of the fastener member with the molding so as to effect flattening of the bowed portion 19 in a manner to be described. The arm 18 has a relatively flat portion 21, in my preferred form, and wing portions 22 extending outwardly from the flat portion 21 in substantially perpendicular relation thereto and in a direction away from the arm 17. Each of the wing portions 22 has a curved camming portion 23 on its upper narrow edge and a shoulder portion 24 on its lower edge.

Assembly of any fastener member with the molding strip 1 is a relatively simple matter and is carried out through first hooking the end portions 20—20 of the arm 17 over the edge 7 of the flange 5 to dispose the portions 20—20 in engagement with the inner surface of the wall of the outer side 4. After this action the fastener member is in position, as shown in Fig. 1, with the camming surfaces 23 of the wing portions 22 in engagement with the edge 8 of the flange 6. Next by a rocking action the camming portions 23 are forced by the edge 8 of the flange 6 against the tension of the bowed portion 19 which tends during this action to flatten out. After the shoulders 24 have passed by the edge 8 of the flange 6 they move into engagement within the molding behind the flange 6 under the tension of the bowed portion 19 of the arm 17 returning toward normal position. Thus the fastener member is easily secured to the molding at any desired point on the length thereof by the simple rocking action hereinabove described. As a result of the yieldable characteristics of the fastener base, the arms 17 and 18 engage the inner surfaces of the molding under spring tension so as to effect a secure and non-rattle assembly. Finally the molding may be secured to the supporting panel 2 through snapping the stud means 12 through the aperture 10 of the supporting panel so as to engage the shoulders 15—15 behind the inner surface 16 of the support (Fig. 3) in a manner well known in the art. Although I have shown only one fastener member secured to the molding strip 1, it is understood that as many fastener members may be provided as are necessary for securing the molding to the support.

Although I have illustrated and described a preferred embodiment of my invention, I do not wish to be limited thereby because the scope of my invention is best defined by the following claims.

I claim:

1. In combination with a hollow part having a substantially flat bottom face and a top face including a curved portion, said part having a longitudinal slot in its bottom face; of a fastener member for securing said part to an apertured support, said fastener member comprising a shank including two spaced legs for engagement with the support through the aperture thereof and a head for snap-fastener engagement with the hollow part through the slot therein, said head comprising opposed pairs of attaching ears, one pair of ears each being substantially flat and disposed in planes normal to the surrounding wall of the hollow part, and having upper arcuate edges to conform generally to the curved portions of the hollow part, a second pair of attaching ears formed as angular extensions from the free end of the opposed leg, said angular extensions being bent outwardly from the first pair of ears to form a bow which is resiliently yieldable in a direction transverse to said head, one of said pairs of ears being freely insertable into the interior of the hollow part through the slot therein and the other pair of ears being passable through said slot by laterally shifting the head and flattening of the bowed ears, permitting the head to be fastened in the hollow part by a snap-action with the first named pair of ears making line contact with the inner wall of the hollow part throughout a substantial portion of their length and the second named ears making edge contact with the inner wall of said part at spaced points on a cross-sectional periphery thereof.

2. In combination with a hollow part having a substantially flat bottom face and a top face including a curved portion, said part having a longitudinal slot in its bottom face; of a fastener member for securing said part to an apertured support said fastener member comprising a shank including two spaced legs for engagement with the support through the aperture thereof and a head for snap-fastener engagement with the hollow part through the slot therein, said head comprising opposed pairs of attaching ears, one pair of ears each being substantially flat and disposed in planes normal to the surrounding wall of the hollow part, and having upper arcuate edges to conform generally to the curved portion of the hollow part, a second pair of attaching ears formed as angular extensions from the free end of the opposed leg, said angular extensions being bent outwardly from the first pair of ears to form a bow which is resiliently yieldable in a direction transverse to said head, said second named pair of ears being freely insertable into the interior of the hollow part through the slot therein to a position such that the bowed portions of said ears make edge contact with the inner walls of said hollow part at spaced points in a cross-sectional periphery thereof, and said first named pair of ears being passable through said slot into the interior of said hollow body, as the latter are moved toward the interior of the body, the arcuate edges of said first named ears constituting cams cooperative with an edge of said slot to shift the head laterally within the hollow part against the tension of said resilient bowed ears, to permit the first named pair of ears to be forced into the interior of said part with a snap-action with the arcuate edges of said ears making contact with the inner wall of the part throughout a substantial portion of their length.

3. In combination with a hollow part having a substantially flat bottom face and an upper face including a curved portion, said part having a longitudinal slot in its bottom face; of a fastener member for securing said part to an apertured support, said fastener means comprising a shank including two spaced legs for engagement with the support through the aperture thereof and a head for snap-fastener engagement with the hollow part through the slot therein, said head comprising opposed pairs of attaching ears, one pair of ears each being substantially flat and disposed in planes normal to the surrounding wall of the hollow part, and having upper arcuate edges to conform generally to the curved portion of the hollow part, and a flat shouldered portion singularly disposed with reference to the arcuate edges for engagement with a flat portion of said hollow part, a second pair of attaching ears formed as angular extensions from the free end of the opposed leg, said angular extensions being bent outwardly from the first pair of ears to form a bow which is resiliently yieldable in a direction transverse to said head, said second named pair of ears being freely insertable into the interior of the hollow part through the slot therein to a position such that the bowed portions of said ears make edge contact with the inner walls of said hollow part, and said first named pair of ears being passable through said slot into the interior of said hollow body, as the latter are moved toward the interior of the body, the arcuate edges of said first named pair of ears constituting cams cooperative with an edge of said slot to shift the head laterally within the hollow part against the tension of said resilient bowed ears, to permit the first named pair of ears to be forced into the interior of said part with a snap-action with the arcuate edges of said ears making contact with the inner wall of the curved portion of the part throughout a substantial length.

4. In combination with a hollow part having a substantially flat bottom face and a top face including a curved portion, said part having a longitudinal slot in its bottom face; of a fastener member for securing said part to an apertured support, said fastener member comprising a shank including two spaced legs for engagement with the support through the aperture thereof and a head for snap-fastener engagement with the hollow part through the slot therein, said head comprising opposed pairs of attaching ears, one pair of ears each being substantially flat and disposed in planes normal to the surrounding wall of the hollow part, and having upper arcuate edges to conform generally to the curved portion of the hollow part, a second pair of attaching ears formed as angular extensions from the free end of the opposed leg, said angular extensions being bent outwardly from the first pair of ears to form a bow which is resiliently yieldable in a direction transverse to said head, the upper and lower edges of said second named pair of ears being disposed in transverse planes inclined with respect to the corresponding edges of the first named ears and being freely insertable into the interior of the hollow part through the slot therein to a position such that the bowed portions of said ears make edge contact with the inner walls of said hollow part, and said first named pair of ears being passable through said slot into the interior of the body, the arcuate edges of said first named pair of ears constituting cams cooperative with an edge of said slot to shift the head laterally within the hollow part against the tension of said resilient bowed ears, to permit the first named pair of ears to be forced into the interior of said part with a snap-action with the arcuate edges of said ears making contact with the inner wall of the curved portion of the part throughout a substantial length.

WILMER H. CHURCHILL.